Figure 2:
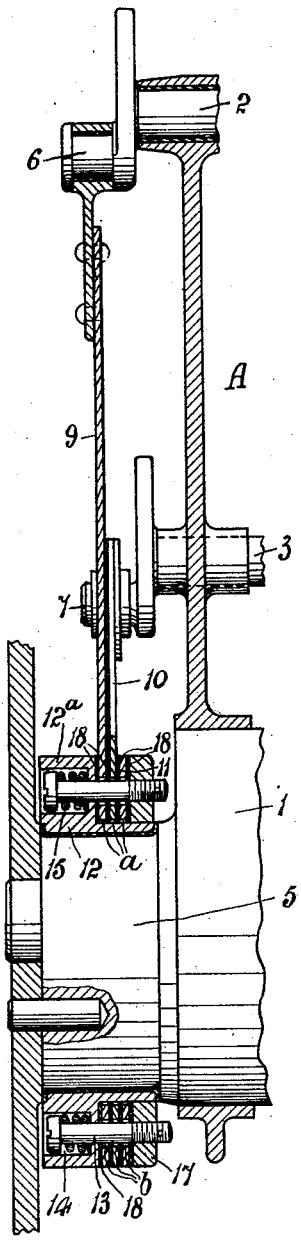

July 15, 1930.   W. NOBLE   1,770,624

SELF ADJUSTING CONNECTING ROD

Filed Nov. 10, 1927

Inventor
Warren Noble.

By

Attorney

Patented July 15, 1930

1,770,624

UNITED STATES PATENT OFFICE

WARREN NOBLE, OF DETROIT, MICHIGAN

SELF-ADJUSTING CONNECTING ROD

Application filed November 10, 1927. Serial No. 232,258.

In my co-pending application, Serial Number 182,668 filed April 11, 1927, is disclosed an engine structure wherein a camshaft is mounted in a detachable cylinder head structure and is operated by a connecting rod from the crankshaft of the engine, means being provided to compensate for slight dimensional differences in the camshaft center relative to the crankshaft center, such means being in the form of adjustment features to admit of the proper setting of the parts in assembling of the engine; and the present invention relates primarily to such a camshaft drive through the agency of a connecting rod, although it is not especially limited to that particular use.

The said application above identified also discloses a connecting rod arrangement wherein a further crank is mounted in the engine intermediate or offset from a plane extending through the camshaft and the crankshaft, and connecting rod is provided with a branch or offset portion coupled to said further crank, whereby a three point connecting rod structure is obtained, and the present invention also is applicable to such a structure.

An object of the present invention is to provide a connecting rod arrangement having self-adjusting qualities whereby slight dimensional differences in the camshaft and crankshaft centers, or of the centers of such other rotary members to which it is applied, will be automatically compensated for, whether such dimensional differences be due to conditions arising from assembly of the shafts or the structures carrying the shafts, or whether they be due, as in an operating engine, to expansion or contraction of the shaft supporting structure resulting from temperature changes.

A further object of the invention is to provide, in a connecting rod, a bearing slightly adjustable on said connecting rod and frictionally held against movement thereon to an extent which makes the said bearing rigid with the connecting rod at normal operating loads and capable of movement relative thereto at excessive loads such as will be set up where the shaft centrs of the shafts coupled by the connecting rod are not dimensionally true with the connecting rod centers.

The invention further contemplates a connecting rod of the type referred to wherein the bearing is secured thereto by means of a friction clutch closed thereon by springs or equivalent means so as to prevent relative movement of said connecting rod on said bearing under normal operating conditions, but sufficiently yielding to permit the self-adjusting movement of the bearing in the event of slight dimensional differences occurring between the shaft centers and the bearing centers of the connecting rod.

Still further, it is proposed in a multiple point connecting rod arrangement, such as hereinbefore referred to, to provide an additional connecting rod or rods extending from the adjustable bearing of a main connecting rod and also rigid therewith within the limits of normal operating load and capable of self-adjustment on the said bearing under circumstances such as those hereinbefore mentioned.

Still further objects or advantages subsidiary or incidental to the aforesaid objects, or resulting from the construction or operation of the invention as it may be carried into effect, will become apparent as the said invention is hereinafter further disclosed.

In carrying the said invention into effect, I may adopt the novel construction and arrangement of parts hereinafter described, by way of example, having reference to the accompanying drawing, wherein:—

Figure 1:
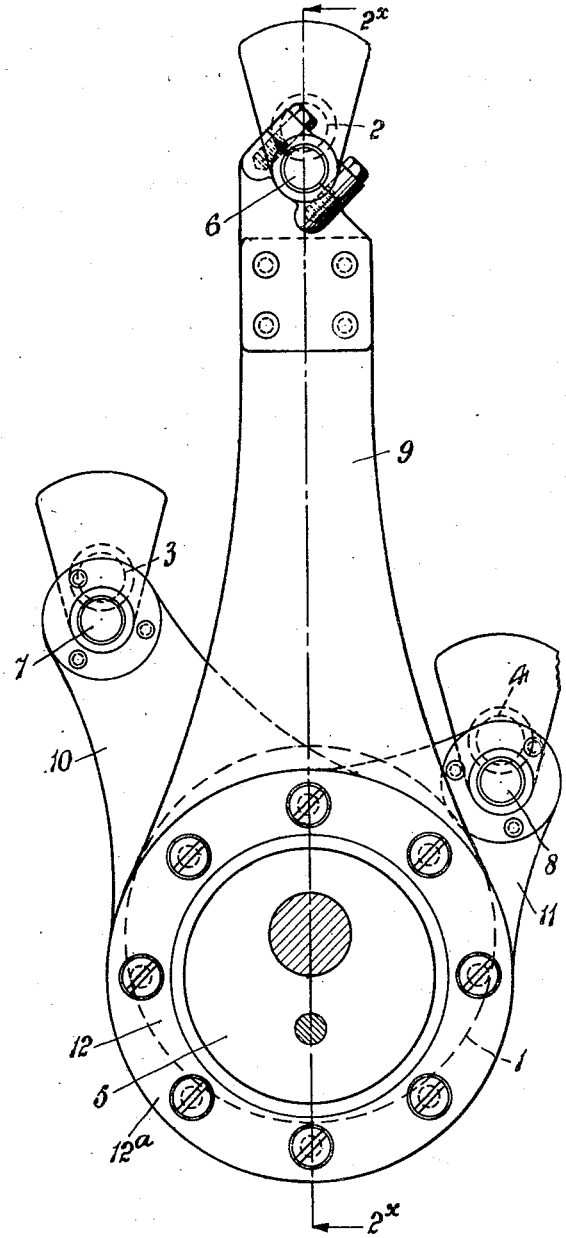

Figure 1 is an elevation of a triple connecting rod arrangement embodying the said invention; and Figure 2 is a vertical section of the same taken on the line $2^x$—$2^x$ of Figure 1.

Similar characters of reference indicate similar parts in both figures of the drawing.

1 indicates what may be the crankshaft of an engine and 2 what may be an overhead camshaft, 3 and 4 being further shafts intended to be operated from the said shaft 1, which is provided with an eccentric extension or wrist pin 5. The shafts 2, 3 and 4 are provided with cranks 6, 7 and 8 for their operation by the eccentric 5 through the medium of connecting rods 9, 10 and 11, respectively, the outer ends of which are provided with suitable bearings engaging their respective cranks.

The inner ends of these rods have large openings *a* therein through which is passed the reduced portion of a sleeve or bearing 12 mounted on the eccentric 5, and this bearing has an enlarged portion 12$^a$ from which extend, in the direction of the axis of the eccentric, a circular series of bolts or pins 13 the heads of which are accommodated in recesses 14 in the enlargement of the bearing. These recesses also house springs 15 operating against the inner shoulders of the said heads as shown in Figure 2 of the drawing. The inner ends of the said connecting rods have corresponding orifices *b* through which the said pins 13 extend, and the outer ends of the said pins are secured to a ring 17 which is pulled towards the said connecting rods by the action of the said springs 15.

Frictional rings 18 of any suitable material are interposed between overlapping connecting rod ends about the bearing 12, and between the enlargement of the bearing and the adjacent connecting rod as well as between the pressure ring 17 and its adjacent connecting rod, so that by virtue of the action of the said springs 15 the pressure ring 17 effects a frictional binding together of the connecting rod ends about the said bearing 12.

It will be noted that the main orifices *a* of the connecting rods are appreciably larger than the outside diameter of the reduced portion of the bearing 12, thus providing annular clearance between the said connecting rods and the said bearing, and that the orifices *b* of the said connecting rods are also larger than the diameter of the pins 13 thereby providing a similar clearance about the pins.

It is thus apparent that the axial relationship of these orifices and consequent relationship of the connecting rods to the axis of the eccentric 5 is maintained by the frictional means described, and it is intended that the resistance of such frictional means shall be such as to maintain the connecting rods rigid with the bearing 12 at normal operating loads such as are imposed on the shafts 2, 3 and 4, which they operate. This resistance, however, is limited to the extent that it may be overcome by excessive loads imposed on the connecting rods, such as would result from change in the positions of the shafts 2, 3 and 4, or any of them, relative to the shaft 1, resulting, for instance, from expansion or contraction of the frame A in which the said shafts are mounted. The limitation of this self-adjustment of the connecting rods is that of the clearance at *a* and *b* about the bearing 12 and pins 13.

If desired, the said connecting rods may be of flat sheet metal, as shown, having sufficient rigidity for the transmission of power required without distortion, but also having a sufficient flexibility whereby they may be sprung or bowed in one or other direction from their normal planes to accommodate slight endwise displacement of the shafts and their cranks, as will be readily understood.

This invention may be developed within the scope of the following claims without departing from the essential features of the said invention, and it is desired that the specification and drawing be read as being merely illustrative and not in a limiting sense, except as necessitated by the prior art.

What I claim is:—

1. In combination with a connecting rod bearing, a plurality of connecting rods extending therefrom and having clearance about the said bearing to permit relative movement between said rods and said bearing, and yieldable means preventing such relative movement prior to loading thereon surpassing a predetermined amount.

2. In combination with a connecting rod bearing, a plurality of connecting rods extending therefrom and having clearance about the said bearing to permit relative movement between said rods and said bearing, and frictional means connecting said rods to one another and to said bearing, said means normally preventing said relative movement.

3. In combination with a connecting rod bearing, a plurality of connecting rods extending therefrom and having clearance about the said bearing to permit relative movement between said rods and said bearing, frictional means connecting said rods to one another and to said bearing, said means normally preventing said relative movement, and means determining the frictional resistance of said means.

4. In a machine structure in combination, a main shaft, a plurality of auxiliary shafts, and a multi-point connecting rod device coupling said shafts together for synchronous operation, said device including a connecting rod member extending from each auxiliary shaft to said main shaft, a common bearing element for said members on said main shaft, and means yieldably connecting said members to said bearing element in frictional engagement whereby said members are movable in the direction of their length laterally of said bearing, against the resistance of said means, when subjected to excessive load.

5. In a machine structure in combination, a main shaft, a plurality of auxiliary shafts, and a multi-point connecting rod device coupling said shafts together for synchronous operation, said device including a connecting rod member extending from each auxiliary shaft to said main shaft, a common bearing element for said members on said main shaft, and means frictionally maintaining said rod members in fixed relation to one another and to said bearing element at normal operating load, said rod members being shiftable relative to said bearing element at loads in excess of the normal.

In testimony whereof I affix my signature.

WARREN NOBLE.